(12) United States Patent
Uozumi

(10) Patent No.: US 7,114,586 B2
(45) Date of Patent: Oct. 3, 2006

(54) VEHICLE-MOUNTING STRUCTURE FOR FUEL CELL SYSTEM

(75) Inventor: Tetsuo Uozumi, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/095,607

(22) Filed: Apr. 1, 2005

(65) Prior Publication Data
US 2005/0230164 A1 Oct. 20, 2005

(30) Foreign Application Priority Data
Apr. 16, 2004 (JP) .............................. 2004-122217

(51) Int. Cl.
B60K 1/00 (2006.01)
(52) U.S. Cl. .................... 180/68.1; 180/68.4; 180/65.1
(58) Field of Classification Search ............... 180/68.1, 180/68.4, 65.1
See application file for complete search history.

(56) References Cited

U.S. PATENT DOCUMENTS 5,249,637 A * 10/1993 Heidl et al. ................. 180/65.2
6,244,367 B1 * 6/2001 Ahmed et al. ............. 180/65.1
6,860,349 B1 * 3/2005 Ogawa et al. ............. 180/65.2
6,899,062 B1 * 5/2005 Bruck et al. ............. 123/41.31

FOREIGN PATENT DOCUMENTS

JP 2003-178767 A 6/2003

* cited by examiner

Primary Examiner—Hau Phan
Assistant Examiner—Cynthia F. Collado
(74) Attorney, Agent, or Firm—Foley & Lardner LLP

(57) ABSTRACT

A vehicle-mounting structure for a fuel cell system of the present invention has a fuel cell, and a hydrogen-related component in which hydrogen to be supplied to the fuel cell flows. In the structure, the fuel cell and the hydrogen-related component are mounted in a space on a front portion in a vehicle body, a hood covering a top opening of the space is inclined downward from a rear side to a front side in the vehicle body, and the hydrogen-related component is placed at a position on the rear side and upper side of the fuel cell in the vehicle body.

10 Claims, 2 Drawing Sheets

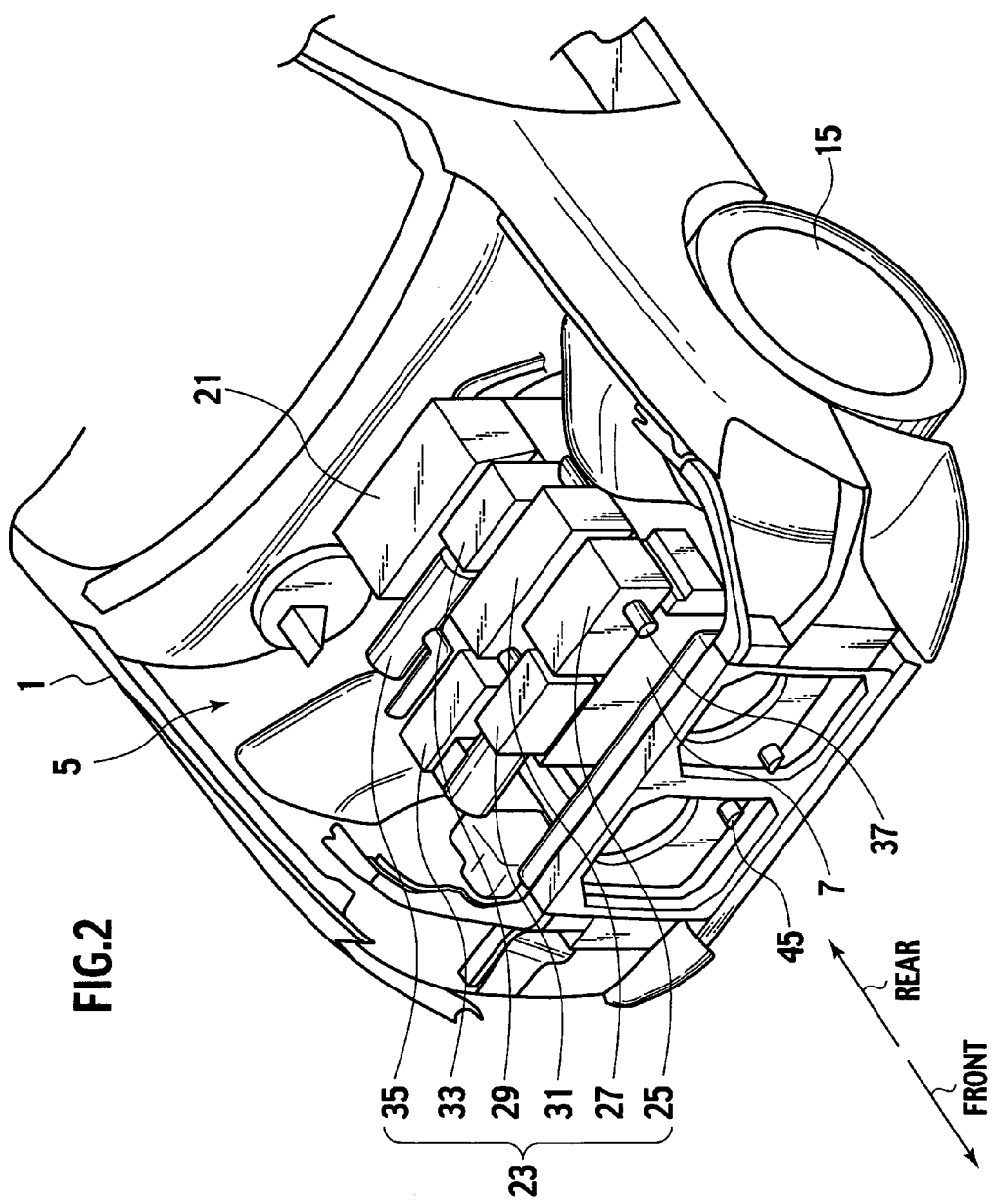

VEHICLE-MOUNTING STRUCTURE FOR FUEL CELL SYSTEM

BACKGROUND OF THE INVENTION

1. Field of the Invention

The present invention relates to a vehicle-mounting structure for a fuel cell system, in which a fuel cell is mounted in a space in a front portion of a vehicle.

2. Description of the Related Art

A vehicle having a fuel cell mounted on a space of the front portion of the vehicle body is disclosed in Japanese Patent Laid-Open Publication No. 2003-178767.

SUMMARY OF THE INVENTION

In such a fuel cell vehicle, auxiliaries such as hydrogen-related component in which hydrogen to be supplied to the fuel cell flows, and air-related components in which air to be supplied to the fuel cell flows, need to be placed near the fuel cell. Therefore, where the fuel cell is mounted in a space in the front portion of the vehicle body, these auxiliaries are also mounted on the front portion of the vehicle body.

Therefore, when the fuel cell and these auxiliaries are mounted within this limited space in the front portion of a vehicle body, it is necessary to enhance an efficient use of the space by minimizing unused space.

An object of the present invention is to arrange a fuel cell and these auxiliaries efficiently within a space in a front portion of a vehicle body.

According to one aspect of the present invention, there is provided a vehicle-mounting structure for a fuel cell system comprising: a fuel cell; and a hydrogen-related component in which hydrogen to be supplied to the fuel cell flows, wherein the fuel cell and the hydrogen-related component are mounted in a space on a front portion in a vehicle body, a hood covering a top opening of the space is inclined downward from a rear side to a front side in the vehicle body, and the hydrogen-related component is placed at a position on the rear side and upper side of the fuel cell in the vehicle body.

BRIEF DESCRIPTION OF THE DRAWINGS

The invention will now be described with reference to the accompanying drawings wherein;

FIG. 2 is a perspective view showing a structure in a front portion of a fuel cell vehicle without a hood.

DETAILED DESCRIPTION OF THE PREFERRED EMBODIMENT

Figure 1:
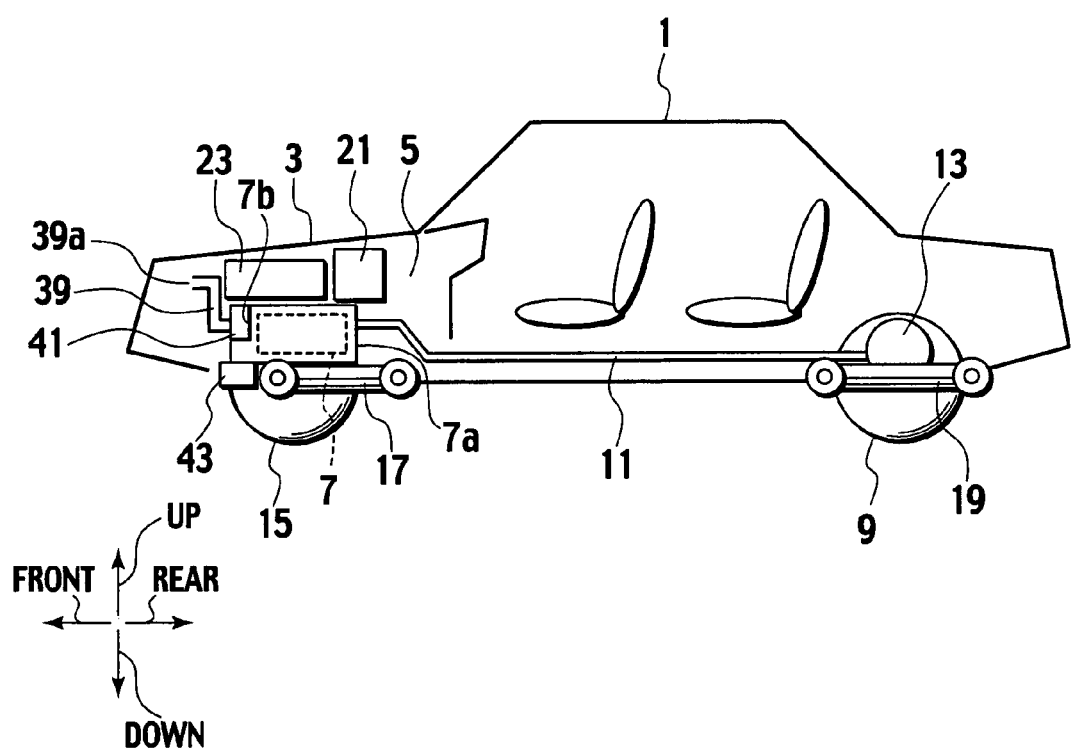
FIG. 1 is a schematic cross-sectional view showing a fuel cell vehicle of the present invention.

An embodiment of the present invention is described below with reference to the drawings.

FIG. 1 schematically shows a fuel cell vehicle according to the embodiment of the present invention. Note that, in the drawing, a direction indicated by "FRONT" is a forward direction of a vehicle body, a direction indicated by "REAR" is a rearward direction of the vehicle body, a direction indicated by "UP" is an upward direction of the vehicle body, and a direction indicated by "DOWN" is a downward direction of the vehicle body.

Underneath a hood 3 provided in the front portion of a vehicle body 1, a space 5 is formed and a fuel cell 7 is mounted within the space 5. Rear wheels 9 are provided at the rear of the vehicle body 1, and a vehicle drive motor 13 is placed between the rear wheels 9 provided on the right and left sides. Electric power generated by the fuel cell 7 is supplied to the motor 13 through an electric cable 11, driving the rear wheels 9. Note that Reference Numerals 15, 17 and 19 represent front wheels, a front suspension member, and a rear suspension member, respectively.

In the rearward direction of the vehicle body and the downward direction thereof with respect to the fuel cell 13, a hydrogen-related component 21, in which hydrogen to be supplied to the fuel cell 7 flows, is placed as an auxiliary of the fuel cell 7. Air-related components 23, in which air to be supplied to the fuel cell 7 flows, are placed in the space formed on the front side of the hydrogen-related component 21 in the vehicle body and above the fuel cell 7.

An example of the hydrogen-related component 21 is a hydrogen circulator which circulates hydrogen discharged from the fuel cell 7 and re-supplies the discharged hydrogen to the fuel cell 7. An example of the air-related components 23 is a humidifier which humidifies air to be supplied to the fuel cell 7 by using moisturized air discharged from the fuel cell 7.

FIG. 2 shows a structure within the space 5 without the hood 3. In this drawing, the air-related components 23 include an air cleaner 25, a microfilter 27, an after cooler 29, which are placed in this order from the front side of the vehicle body on the left hands side of the same, as well as an air compressor 31, a compressor inverter 33, and a humidifier 35, which are placed in this order from the front side of the vehicle body on the right hand side of the same.

As the air compressor 31 is driven, air is taken in from an air intake 37 provided in the front portion of the air cleaner 25. Thereafter, air taken in is filtered through the air cleaner 25. The filtered air then passes through the air compressor 31 and is further filtered through the microfilter 27, before being cooled by the after cooler 29 and reaching the humidifier 35.

As mentioned earlier, the humidifier 35 humidifies air sent from the after cooler 29 by using moisturized air discharged from the fuel cell 7, and supplies the humidified air to the fuel cell 7.

Meanwhile, hydrogen is, for example, supplied from a non-illustrated hydrogen tank at the rear of the vehicle body to a hydrogen circulator (hydrogen-related component 21) through a hydrogen pipe. Hydrogen is then supplied to the fuel cell 7 together with hydrogen discharged from the fuel cell 7.

The fuel cell 7 is accommodated within a casing 7a. This casing 7a is provided with a ventilation passage 39 which communicates with the inside of the casing 7a. The ventilation passage 39 can ventilate the casing by releasing air heated by heat generation when the fuel cell 7 generates electric power. The ventilation passage 39 can also discharge a slight amount of hydrogen leaking from the fuel cell 7. An intake 39a for taking in air for ventilation is provided at one end of the ventilation passage 39. This intake 39a is located on the front side of the air-related components 23 in the vehicle body and opens towards the front of the vehicle body.

In addition, an opening 7b is provided on the side surface of the casing 7a of the fuel cell 7 towards the front of the vehicle body, and a ventilation fan 41 is connected to the opening 7b. The other end of the ventilation passage 39 is connected to this ventilation fan 41. In FIG. 2, the ventilation passage 39 connected to the ventilation fan 41 is not illustrated.

A cooling water pump 43 is placed underneath the fuel cell 7. The cooling water pump 43 is a cooling medium pump which transfers a medium for cooling down the fuel cell 7. The cooling water pump 43 is positioned so that it does not interfere with vehicle body structural members such as the front suspension member 17. The cooling water pump 43 is approximately horizontal to the vehicle body structural members on which the fuel cell 7 is mounted and fixed, and fixed at a position lower than the fuel cell. FIG. 2 shows cooling water pipes 45 connected to the cooling water pump 43. The front sides of the cooling water pipes 45 are connected to a radiator which is not shown.

In this vehicle-mounting structure for a fuel cell system, the hood 3 is inclined from the rear side to the front side of the vehicle body so that the height of the space at the rear side of the vehicle body is greater than that of the front side. In this space having non-uniform height between the inclined hood 3 and the fuel cell 7, the hydrogen-related component 21 is placed on the rear side of the vehicle body and the air-related components 23 are placed in the front side of the vehicle body in accordance with the height of the space.

Accordingly, the fuel cell 7 and these auxiliaries such as the hydrogen-related component 21 and the air-related components 23 can be efficiently arranged within the space 5 in the front portion of the vehicle body with the least wasted space.

Further, since the hydrogen-related component 21 and the air-related components 23 are placed in the upper area of the space 5, maintenance works on these components such as filter replacement can be carried out easily by opening the hood 3.

Moreover, since the fuel cell 7 which is heavier than the auxiliaries is placed in the lower area of the space 5, the center of gravity of the vehicle is lowered. This stabilizes the behavior of the vehicle when cornering and decelerating, contributing to an improvement of driving performance. Even where hydrogen leaks from the hydrogen-related component 21, hydrogen is easily dispersed towards the upper direction of the vehicle body.

Furthermore, the diameter of the hydrogen pipe can be made small up to a certain extent. Therefore, even where a non-illustrated hydrogen tank is placed at the rear of the vehicle and the hydrogen-related component 21 is located within the space 5 in the front portion of the vehicle, bad layout of the pipe from the rear of the vehicle can be prevented.

As the hydrogen-related component 21, a component may be used which takes in ambient air to attenuate hydrogen discharged from the fuel cell 7 when disposing hydrogen discharged from the fuel cell 7 by releasing it. In this case, this hydrogen-related component 21 is placed at the upper area of the space 5 to be away from the ground. Therefore, it is possible to prevent water splashing from the ground from being mixed with air taken by the component.

Meanwhile, the air-related components 23 are placed on the front and upper side of the vehicle body within the space 5. Therefore, an intake duct connected to the air intake 37 of the air cleaner 25 can be shortened, and, at the same time, layout of the components within the space 5 is improved and the vehicle weight can be reduced. Moreover, the air-related components 23 having a higher ratio of volume to mass than the fuel cell 7 are placed in the upper area of the space 5. This is effective in lowering the center of gravity of the vehicle in comparison with a case where the air-related components 23 are placed in the lower area of the space 5, and vehicle performance of cornering and deceleration is thus improved.

Further, when hydrogen discharged from the fuel cell 7 is released to the atmosphere after being attenuated with air discharged from the fuel cell 7, the quick attenuation is carried out more easily by placing both the hydrogen-related component 21 and the air-related components 23 above the fuel cell 7.

Moreover, the intake 39a of air for ventilating inside of the casing which accommodates the fuel cell 7 is placed in the upper area of the space 5. Therefore, it is possible to prevent water splashing from a road surface from entering into the intake 39a even if it is raining or flooding. This therefore prevents water from entering into the fuel cell 7.

Furthermore, by providing the cooling water pump 43 underneath the fuel cell 7, the cooling water pipe 45 connecting the cooling water pump 43, the fuel cell 7, and the non-illustrated radiator can be placed at a position near the lowermost portion of the vehicle body. Therefore, cavitation is prevented, enabling effective pressure transfer of cooling water and improving cooling performance.

Furthermore, the cooling water pump 43 is placed to be approximately horizontal to the vehicle body structural members such as the front suspension member 17 under the fuel cell 7. Hence, the cooling water pump 43 can be mounted while the fuel cell 7 is placed at a lower position within the space 5. This improves component layout within the space 5 as well as performance of the vehicle when cornering and decelerating.

Moreover, since the cooling water pump 43 is placed underneath the fuel cell 7, maintenance works on the cooling water pump 43 can be carried out easily. Maintenance works on the hydrogen-related component 21 and the air-related components 23 are also carried out easily as they are placed above the fuel cell 7. In the mounting structure of the present invention, the auxiliaries of the fuel cell are placed both underneath and above the fuel cell 7 mounted in the space 5 of the front portion of the vehicle body. Thus, maintenance works of the auxiliaries conducted from the top and bottom of the vehicle body can be sufficiently facilitated.

According to the present invention, the hood covering the top opening of the space in the front portion of the vehicle body is inclined downwards from the rear side of the vehicle body to the front side of the vehicle body. The hydrogen-related component and air-related components are placed above the fuel cell, and the air-related components are placed on the front side of the hydrogen-related component. The auxiliaries are thus arranged effectively along the inclination of the hood.

Moreover, the air-related components are placed above the fuel cell as the auxiliaries. This facilitates maintenance works of the air-related components as portions can be replaced easily, for example. At the same time, the intake duct connected to the air intake can be shortened, improving component layout within the space and reducing the weight of the vehicle.

Furthermore, the fuel cell is accommodated in the casing, and the intake for air to be supplied to inside of the casing for ventilation is provided at a position on the upper and front side of the fuel cell in the vehicle body. Therefore, it is possible to prevent water from entering into the intake and thus to the fuel cell even if it is raining or flooding.

The ventilation fan, which sends air for ventilation to the inside of the casing, is provided in the opening of the casing communicating with the intake of air for ventilation. Therefore, it is possible to ensure that air for ventilation is sent into the casing of the fuel cell from the intake.

Furthermore, the cooling medium pump, which transfers a cooling medium for cooling the fuel cell, is placed underneath the fuel cell. Therefore, the cooling water pipe connecting the cooling medium pump, the fuel cell, and the radiator can be placed at a position near the lowermost portion of the vehicle body. Therefore, occurrence of cavitation within the pipe is prevented, enabling effective pressure transfer of cooling water and improving cooling performance.

Furthermore, the cooling medium pump is placed at a position approximately horizontal to the vehicle body structural members under the fuel cell. Hence, the cooling medium pump can be mounted while the fuel cell is placed at a lower position within the space. This improves component layout within the space as well as performance of the vehicle when cornering and decelerating.

The auxiliaries of the fuel cell are placed both underneath and above the fuel cell mounted in the space in the front portion of the vehicle body. Thus, maintenance works of the auxiliaries carried out from the top and bottom of the vehicle body can be sufficiently facilitated.

The entire content of a Japanese Patent Application No. P2004-122217 with a filing date of Apr. 16, 2004 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A vehicle-mounting structure for a fuel cell system, comprising:
   a fuel cell;
   a hydrogen-related component in which hydrogen to be supplied to the fuel cell flows; and
   an air-related component in which air to be supplied to the fuel cell flows,
   wherein the fuel cell and the hydrogen-related component are mounted in a space on a front portion in a vehicle body,
   wherein a hood covering a top opening of the space is inclined downward from a rear side to a front side in the vehicle body,
   wherein the hydrogen-related component is placed at a position on the rear side and an upper side of the fuel cell in the vehicle body, and
   wherein the air-related component is placed at a position on the upper side of the fuel cell and a front side of the hydrogen-related component in the vehicle body.

2. A vehicle-mounting structure for a fuel cell system, comprising:
   a fuel cell;
   a hydrogen-related component in which hydrogen to be supplied to the fuel cell flows; and
   a casing which accommodates the fuel cell,
   wherein the fuel cell and the hydrogen-related component are mounted in a space on a front portion in a vehicle body,
   wherein a hood covering a top opening of the space is inclined downward from a rear side to a front side in the vehicle body,
   wherein the hydrogen-related component is placed at a position on the rear side and an upper side of the fuel cell in the vehicle body,
   wherein the casing communicates with an intake which takes in air used for ventilation, and
   wherein the intake is provided at a position on the upper side and a front side of the fuel cell in the vehicle body.

3. The vehicle-mounting structure for a fuel cell system according to claim 2, further comprising:
   a ventilation fan which is provided in an opening of the casing, which takes in the air from the intake, and which sends the air into the casing.

4. The vehicle-mounting structure for a fuel cell system according to claim 1, further comprising:
   a cooling medium pump which is mounted on a lower side of the fuel cell in the vehicle body and transfers a medium for cooling the fuel cell.

5. The vehicle-mounting structure for a fuel cell system according to claim 4,
   wherein the cooling medium pump is placed so that the cooling medium pump is at least one of horizontal and substantially horizontal to a vehicle body structural member located on the lower side of the fuel cell in the vehicle body.

6. A vehicle, comprising:
   at least one wheel; and
   a vehicle-mounting structure for a fuel cell system according to claim 1.

7. A vehicle, comprising:
   at least one wheel; and
   a vehicle-mounting structure for a fuel cell system according to claim 2.

8. A vehicle, comprising:
   at least one wheel; and
   a vehicle-mounting structure for a fuel cell system according to claim 3.

9. A vehicle, comprising:
   at least one wheel; and
   a vehicle-mounting structure for a fuel cell system according to claim 4.

10. A vehicle, comprising:
    at least one wheel; and
    a vehicle-mounting structure for a fuel cell system according to claim 5.

* * * * *